United States Patent
Sato

(10) Patent No.: US 6,525,787 B1
(45) Date of Patent: Feb. 25, 2003

(54) LIQUID CRYSTAL DISPLAY DEVICE

(75) Inventor: Takusei Sato, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/151,708

(22) Filed: Sep. 11, 1998

(30) Foreign Application Priority Data

Sep. 11, 1997 (JP) .............................................. 9-246283

(51) Int. Cl.$^7$ ............................................. G02F 1/1368
(52) U.S. Cl. ........................... 349/43; 349/110; 349/111
(58) Field of Search .......................... 349/44, 110, 111, 349/5, 122, 43, 46; 257/57, 72

(56) References Cited

U.S. PATENT DOCUMENTS

| | | | | |
|---|---|---|---|---|
| 5,233,211 A | * | 8/1993 | Hayashi et al. ................ | 349/44 |
| 5,715,022 A | * | 2/1998 | Takamatsu et al. .......... | 348/759 |
| 5,754,261 A | * | 5/1998 | Lyn ............................... | 349/44 |
| 5,760,861 A | * | 6/1998 | Kim ............................. | 349/110 |
| 5,902,031 A | * | 5/1999 | Urabe ........................... | 353/31 |
| 5,973,759 A | * | 10/1999 | Itoh et al. ....................... | 349/5 |
| 5,993,004 A | * | 11/1999 | Moseley et al. ................ | 353/8 |
| 6,038,004 A | * | 3/2000 | Nanno et al. .................. | 349/44 |
| 6,175,395 B1 | * | 1/2001 | Yamazaki et al. ............. | 349/44 |

* cited by examiner

Primary Examiner—William L. Sikes
Assistant Examiner—Tai Duong
(74) Attorney, Agent, or Firm—Rader, Fishman & Grauer PLLC; Ronald P. Kananen, Esq.

(57) ABSTRACT

A liquid crystal panel and a liquid crystal projection display apparatus comprising the liquid crystal panel, the liquid crystal panel comprising an insulating substrate, plural pixel electrode formed above said insulating substrate, plural thin film transistors each driving each of said pixel electrode, and a light-shielding layer formed between said thin film transistor and said insulating substrate.

9 Claims, 4 Drawing Sheets

LIQUID CRYSTAL DISPLAY DEVICE

BACKGROUND OF THE INVENTION

The present invention relates to a liquid crystal display device, and particularly relates to a liquid crystal display device suitable for a projection-type display apparatus.

In a liquid crystal display device using a polycrystalline silicon thin film transistor (hereinafter referred to as "polycrystalline Si-TFT") having a top gate structure or a planer structure as a switching element for a pixel electrode, since the active layer of the polycrystalline Si-TFT is formed in the undermost layer of the driving substrate in which the polycrystalline Si-TFT is formed, light incident from the side of the driving substrate is incident directly on the active layer of the polycrystalline Si-TFT.

In general, light incident from a counter substrate is shielded by a black matrix for shielding the part other than pixel openings, which is provided on the counter substrate or as a layer in the driving substrate upper than the polycrystalline Si-TFT (i.e., the counter substrate side with respect to the polycrystalline Si-TFT), so as to simultaneously shield incident light to the polycrystalline Si-TFT. Furthermore, because the light from a light source is generally incident from the counter substrate side, the light incident from the driving substrate is so-called stray light such as return light of the light passing through the panel.

The polycrystalline silicon has less light sensitivity than the amorphous silicon. However, the recent liquid crystal display device is often used under a large amount of light such as a projector, and thus a light leakage current cannot be ignored in the polycrystalline Si-TFT.

SUMMARY OF THE INVENTION

The present invention is a liquid crystal display device for solving the above-described problems.

That is, the invention relates to a liquid crystal display device comprising a driving substrate having thereon a pixel electrode and a pixel transistor for driving the pixel electrode, the pixel transistor comprising a top gate type or planer type thin film transistor, wherein a light-shielding layer is provided as an underlayer of the pixel transistor. At least edge parts of a source/drain of the pixel transistor are shielded from light by the light-shielding layer.

In the liquid crystal display device of the invention comprising a driving substrate having thereon a pixel electrode and a pixel transistor for driving the pixel electrode, because the light-shielding layer is provided as an underlayer of the pixel transistor comprising a top gate type or planer type thin film transistor, stray light, i.e., return light of the light passing through the panel and incident on the pixel transistor from the side of the driving substrate, is shielded by the light-shielding layer and is not incident on the pixel transistor. The generation of a light leakage current is suppressed. This effect of suppression of a light leakage current can be obtained when at least the edge parts of the source/drain of the pixel transistor are shielded from light.

DESCRIPTION OF THE PREFERRED EMBODIMENTS

Figure 1A:
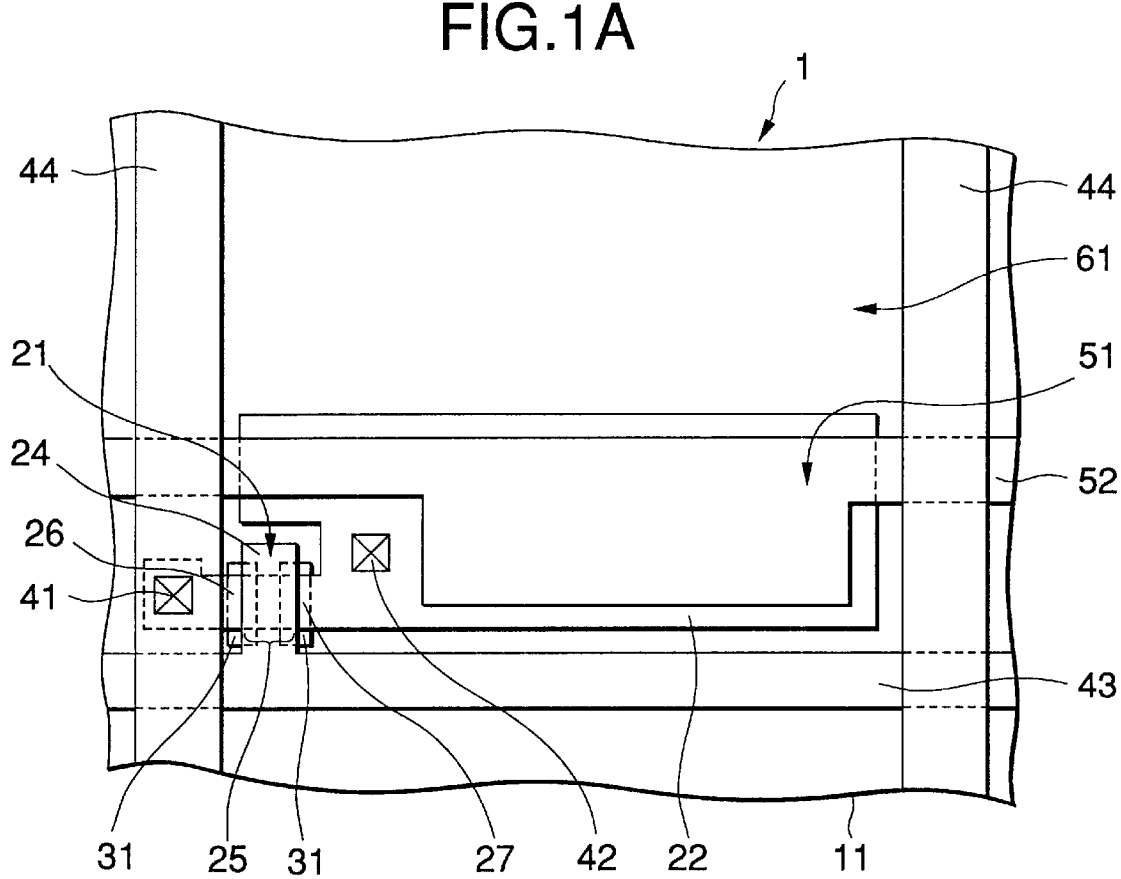
FIG. 1A is a diagrammatic plan view of an important part of the first embodiment of the liquid crystal display device of the invention.
Figure 1B:
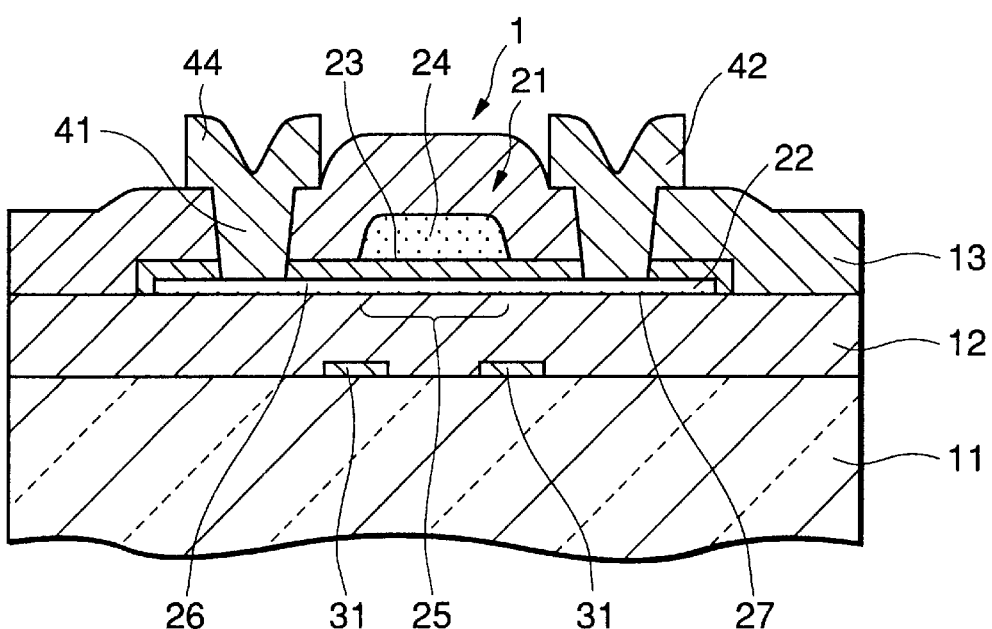
FIG. 1B is an enlarged cross sectional view of FIG. 1A.

The first embodiment of the invention is described by referring to FIGS. 1A and 1B. FIG. 1A is a diagrammatic plane view, and FIG. 1B is an enlarged cross sectional view along the longitudinal direction of the channel of the thin film transistor.

As shown in FIGS. 1A and 1B, a top gate type thin film transistor (called TFT hereinafter) 21 as a pixel transistor is formed on a driving substrate 11 through an insulating film 12. The driving substrate 11 is a transparent substrate comprising, for example, a quartz glass substrate. The insulating film 12 comprises, for example, non-doped silicate glass (NSG) formed by AP-CVD having a thickness of 400 nm. The TFT 21 comprises a semiconductor thin film 22 comprising a polycrystalline silicon layer as an active layer of the TFT 21, and a gate electrode 24 formed on the semiconductor thin film 22 through a gate insulating film 23. A channel part 25 is provided on the semiconductor thin film 22 under the gate electrode 24. A source 26 and a drain 27 are provided on both sides of the channel part 25. The semiconductor thin film 22 is provided by LP-CVD, for example.

A light-shielding layer 31, which shields a region expanding ±1.0 μm from the edges of the source/drain 26 and 27 of the TFT 21 in the longitudinal direction of the channel of the TFT 21, is provided between the driving substrate 11 and the insulating film 12. The light-shielding layer 31 preferably comprises a film having a high resistance, for example, non-doped polycrystalline silicone formed into a film by LP-CVD having a thickness of 75 nm. The edge parts of the source/drain 26 and 27 of the TFT 21 to be shielded from light is a region expanding ±1.0 μm, at least ±0.5 μm, from the edge of the gate electrode 24 in the longitudinal direction of the channel of the TFT 21.

On the driving substrate 11, an interlayer insulating film 13 is formed to cover the TFT 21. A leader electrode 41 connected to the source/drain (source) 26 of the TFT 21 and a leader electrode 42 connected to the source/drain (drain) 27 of the TFT 21 are provided on the interlayer insulating film 13.

The driving substrate 11 has pixel parts 61 arranged in a matrix form. The TFT 21 is formed corresponding to each of the pixel parts 61. Furthermore, a pixel electrode (not shown in figure) connecting the leader electrode 42 through the interlayer insulating film is formed on the pixel part 61. A counter substrate equipped with a counter electrode is provided through a liquid crystal.

A scanning line (gate line) 43 scanning a row of the TFT 21 corresponding to a row of the pixel part 61 and a signal line 44 supplying a prescribed image signal to a column of the TFT 21 corresponding to a column of the pixel part 61. The scanning line 43 is formed as continuous to the gate electrode 25. The signal line 44 is formed as continuous to the leader electrode 41. For example, the leader electrodes 41 and 42 and the signal line 44 are formed in the same layer.

An auxiliary capacitance 51 is formed on the semiconductor thin film 22, in addition to the TFT 21. The auxiliary capacitance 51 comprises the semiconductor thin film 22 as one electrode, an auxiliary wiring 52 as the other electrode, and a dielectric film (not shown in figure), for example, comprising the same layer as the gate insulating film 23 sandwiched by the electrodes. The auxiliary wiring 52 is formed, for example, in parallel to the scanning line 43 as the same layer as the scanning line 43.

A liquid crystal display device 1 is constituted as above.

In the liquid crystal display device 1, the pixel transistor comprises the TFT 21 formed on the driving substrate 11 for switching the pixel electrode carried on the liquid crystal display device 1, and the light-shielding layer 31 is formed under the pixel transistor (on the side of the driving substrate 11). Stray light, i.e., return light of the light passing through the panel and incident on the TFT 21 from the side of the driving substrate 11, is thus shielded by the light-shielding layer 31, and is not incident on the TFT 21, particularly the edge parts of the source/drain 26 and 27. Therefore, the generation of light leakage current is suppressed in the TFT 21. Since the light-shielding layer 31 is formed as lower than the TFT 21 through the insulating film 12, it is difficult to form a parasitic capacitance with the polycrystalline silicon layer 22.

While the TFT 21 is described as a top gate type, it is also effective to provide the light-shielding layer 31 in a planer type TFT. An LDD (light doped drain) may be formed at the edge of the source/drain 26 and 27 shielded from light.

Figure 2:
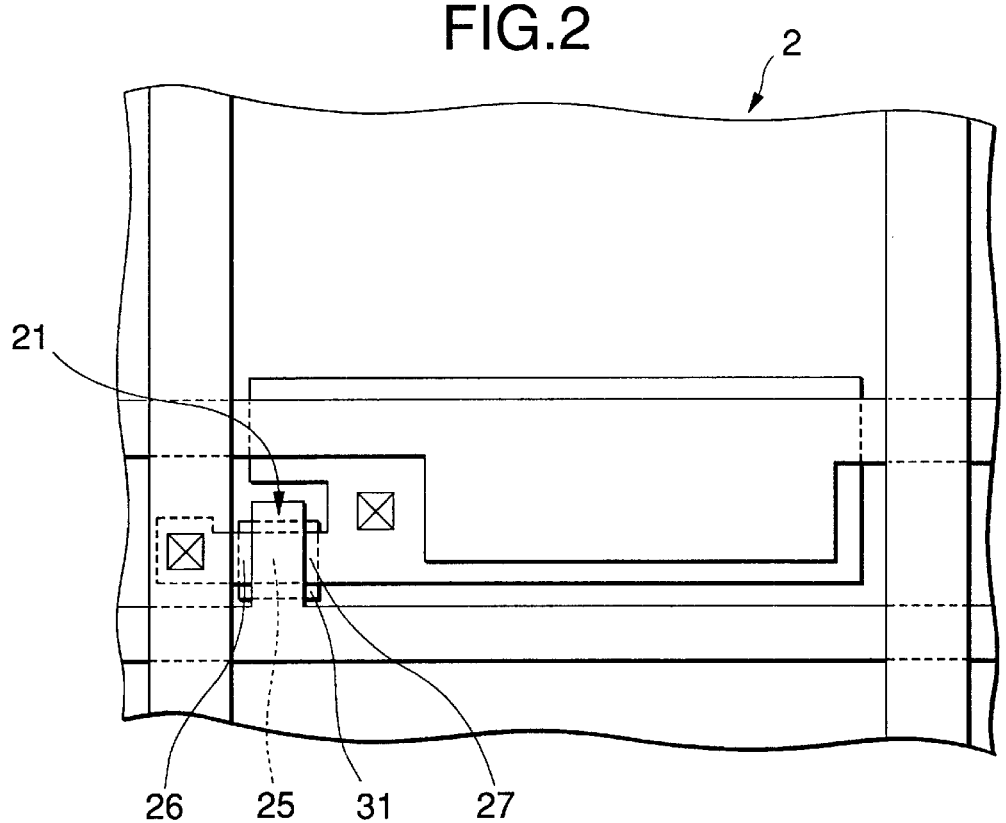
FIG. 2 is a diagrammatic plan view of an important part of the second embodiment of the liquid crystal display device of the invention.

The second embodiment of the invention is described by referring to FIG. 2, which is a diagrammatic plane view. The same symbols as in FIGS. 1A and 1B are attached to the constitutional component in FIG. 2 having the same function as in FIGS. 1A and 1B.

As shown in FIG. 2, a liquid crystal display device 2 has the same constitution as in the liquid crystal display device 1 shown in FIGS. 1A and 1B, but the position of the light-shielding layer 31 is expanded from the edge parts of the source/drain 26 and 27 of the TFT 21 to the channel part 25. In FIG. 2, the light-shielding layer 31 comprises a material having a high resistance, such as non-doped polycrystalline silicon, and is formed as united at the edge parts of the source/drain 26 and 27, as well as the part under the channel part 25 of the TFT 21. The other constitutional components than the light-shielding layer 31 and their arrangement are the same as in the liquid crystal display device 1.

In the liquid crystal display device 2, the same function as in the liquid crystal display device 1 can be obtained, and further because the light-shielding layer 31 is provided under the channel part 25 in addition to the edge parts of the source/drain 26 and 27 of the TFT 21, the generation of a leakage current is further suppressed.

Figure 3:
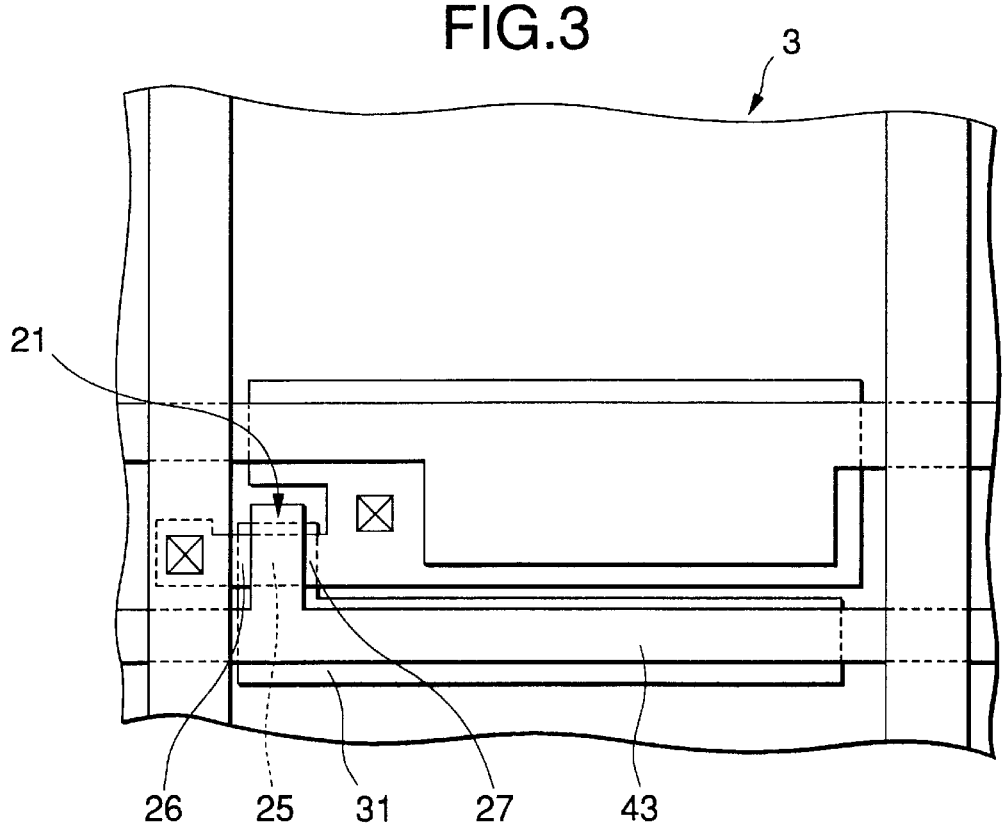
FIG. 3 is a diagrammatic plan view of an important part of the third embodiment of the liquid crystal display device of the invention.

The third embodiment of the invention is described by referring to FIG. 3, which is a diagrammatic plane view. The same symbols as in FIGS. 1A and 1B are attached to the constitutional component in FIG. 3 having the same function as in FIGS. 1A and 1B.

As shown in FIG. 3, a liquid crystal display device 3 has the same constitution as in the liquid crystal display device 1 shown in FIGS. 1A and 1B, but the position of the light-shielding layer 31 is expanded from the edge parts of the source/drain 26 and 27 and the channel part 25 of the TFT 21 to the part under the scanning line 43 for each of the pixels. The other constitutional components than the light-shielding layer 31 and their arrangement are the same as in the liquid crystal display device 1.

In the liquid crystal display device 3, the same function as in the liquid crystal display device 1 can be obtained, and further because the light-shielding layer 31 is provided under the scanning line 43 for each of the pixels in addition to the edge parts of the source/drain 26 and 27 and the channel part 25 of the TFT 21, the generation of a light leakage current is further suppressed.

Figure 4:
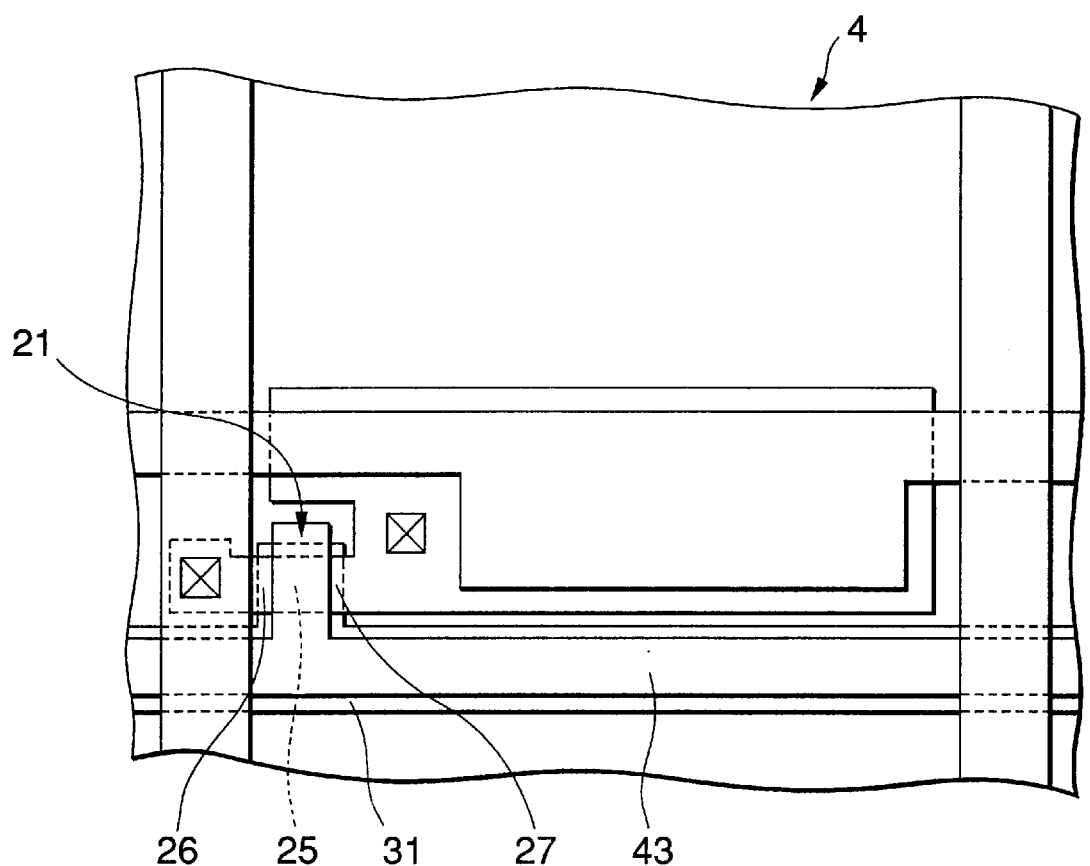
FIG. 4 is a diagrammatic plan view of an important part of the fourth embodiment of the liquid crystal display device of the invention.

The fourth embodiment of the invention is described by referring to FIG. 4, which is a diagrammatic plane view. The same symbols as in FIGS. 1A and 1B are attached to the constitutional component in FIG. 3 having the same function as in FIGS. 1A and 1B.

As shown in FIG. 4, a liquid crystal display device 4 has the same constitution as in the liquid crystal display device 1 shown in FIGS. 1A and 1B, but the position of the light-shielding layer 31 is expanded from the edge parts of the source/drain 26 and 27 and the channel part 25 of the TFT 21 to the part under the scanning line 43 running throughout the pixels. The other constitutional components than the light-shielding layer 31 and their arrangement are the same as in the liquid crystal display device 1.

In the liquid crystal display device 4, the same function as in the liquid crystal display device 1, 2 can be obtained, and further because the light-shielding layer 31 is provided under the scanning line 43 running throughout the pixels in addition to the edge parts of the source/drain 26 and 27 and the channel part 25 of the TFT 21, the generation of a light leakage current is further suppressed.

The light-shielding layer 31 is formed as limited to the part under the scanning line 43 in the third and fourth embodiments. This is because even though the light-shielding layer 31 comprises non-doped polycrystalline silicon having a high resistance, the influence of a signal getting from the adjacent line due to the parasitic capacitance, if any, can be suppressed as minimum, when the adjacent line is the scanning line 43. In the case where the light-shielding layer 31 has a sufficiently high resistance, the whole of the TFT 21 other than the pixel openings may be shielded from light.

As described as referring to the first to fourth embodiments, the light-shielding layer 31 is formed between the driving substrate 11 and the semiconductor thin film 22 as the active layer of the TFT 21 through the insulating film 12, by which the parasitic capacitance formed by the adjacent line with the light-shielding layer 31 can be suppressed. The thickness of the insulating film 12 is preferably at least 100 nm, more preferably from 200 nm to 1.0 $\mu$m. Examples of the material for the insulating film 12 include an $SiO_2$ film and an SiN film formed by LP-CVD, AP-CVD and P-CVD, and a high temperature oxide film by LP-CVD (HTO film) and a non-doped silicate glass (NSG) film are preferably employed.

The light-shielding layer 31 should have a high resistance of at least 10 k$\Omega$ per square to suppress the parasitic capacitance formed by the adjacent line. It is preferable to have a resistance of 1 M$\Omega$ per square or more. Furthermore, the light-shielding layer 31 should have a transmittance with respect to light having a wavelength of from 400 to 500 nm of 70% or lower to suppress the light leakage of the TFT 21. The transmittance is preferably 50% or lower, and more preferably it is further lower to enhance the function of shielding light. The thickness of the light-shielding layer 31 is not particularly limited if both of the resistance and the light shielding function are satisfied, and is practically from 10 nm to 1.0 $\mu$m, and preferably from 20 to 400 nm.

Examples of the material of the light-shielding layer 31 include a polycrystalline silicon thin film, an amorphous silicon thin film, a silicon carbide thin film, an amorphous silicon-germanium thin film and an amorphous silicon-germanium carbide thin film, as considering the compatibility with the process for forming an element such as TFT 21 of polycrystalline silicon as an upper layer of the light-shielding layer 31.

While the first to fourth embodiments are described using the single gate type TFT 21 as the pixel transistor, it may be a transistor having the double gate structure. In such a case, at least the two edge parts of the source/drain parts of the signal line side and the pixel side are shielded from light.

The position at which the light-shielding layer 31 is formed is not limited to the pixel transistor, and by shielding the transistor of the driving circuit in the similar manner, the deterioration of the characteristics due to the trap of the carrier formed with light can be prevented.

Figure 5:
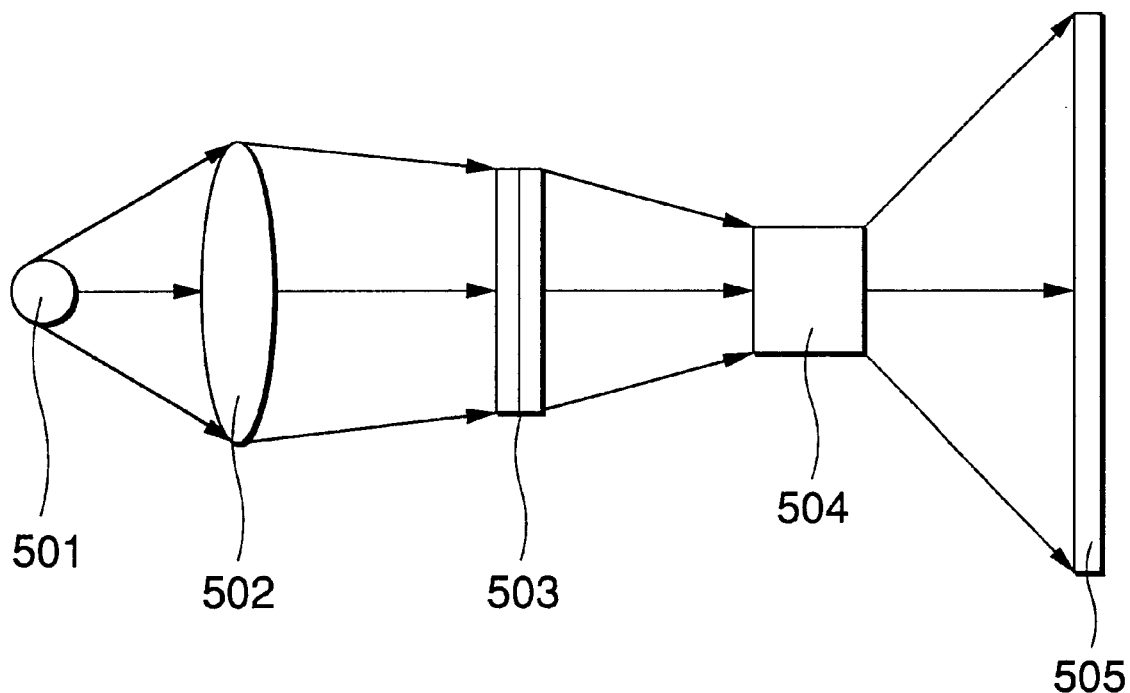
FIG. 5 is a schematic view of one embodiment of a liquid crystal projection display apparatus using a liquid crystal display device of the invention.

One embodiment of a liquid crystal projection display apparatus using the liquid crystal display device according to the invention is described by referring to FIG. 5.

In FIG. 5, numeral 501 denotes a light source, 502 denotes a condenser lens, 503 denotes a liquid crystal display device, 504 denotes a projection lens, and 505 denotes a screen. The light source 501 and the condenser lens 502 function as a light generating part, the liquid crystal display device 503 functions as an image forming part, the projection lens 504 functions as an image enlarging part, and the screen 505 functions as a display part.

The liquid crystal projection display apparatus shown in FIG. 5 has liquid crystal display devices for each of the three primary colors, R, G and B, and lights modulated in each of the liquid crystal display devices are integrated and projected on the screen 505 by the single projection lens 504. In this case, the liquid crystal projection display apparatus further comprises an optical system for color separation and an optical system for color integration.

In the invention as described in the foregoing, the liquid crystal display device comprises a driving substrate having thereon a pixel electrode and a pixel transistor for driving the pixel electrode, the pixel transistor comprising a top gate type or planer type thin film transistor, and a light-shielding layer is provided as an underlayer of the pixel transistor. Stray light, i.e., return light of the light passing through the panel and incident on the pixel transistor from the side of the driving substrate, can be thus shielded by the light-shielding layer. Therefore, the amount of light incident on the pixel transistor from the side of the driving substrate can be suppressed, and a luminous dot and crosstalk due to a light leakage current can be suppressed. As a result, an image with good quality can be obtained.

In the liquid crystal projection display apparatus according to the invention, by providing the light-shielding layer is formed under the thin film transistor constituting the pixel transistor or the peripheral driving circuit, return light of the light passing through the liquid crystal display device is prevented from being incident on the active layer of the thin film transistor. By employing such a structure, the light. leakage current of the thin film transistor can be suppressed even in the liquid crystal display device used under strong light as in the projection display device.

What is claimed is:

1. A liquid crystal panel comprising
    a driving substrate;
    an insulating film formed on said driving substrate;
    a semiconductor thin film formed above said insulating film as an active layer of a thin film transistor and defining a source region, a drain region, and a channel part under a gate electrode formed on said thin film, said source region and said drain region provided on both sides of the channel part;
    a plurality of said thin film transistors each respectively driving each of an associated plurality of pixel electrodes; and
    a light-shielding layer formed in said insulating film between said thin film of said thin film transistor and said driving substrate, wherein said light-shielding layer comprises a material having a resistance of 10 kΩ per square or more shielding a region extended at least a distance from edge parts of the source region and the drain region in the longitudinal direction of said channel region; and
    a plurality of electrodes connected to the source and the drain regions on an insulating film covering said thin film transistor,
    wherein said light-shielding layer shields at least edge parts of at least one of said source and said drain regions, and
    wherein a low concentration region is formed in said edge parts of said source/drain shielded by said light-shielding layer.

2. A liquid crystal panel as claimed in claim 1, wherein said light-shielding layer is formed to shield from light a source/drain region and a channel forming region of said thin film transistor.

3. A liquid crystal panel as claimed in claim 1, wherein said light-shielding layer is formed to shield from light a source/drain region, a channel forming region, and gate lines of each of said pixels of said thin film transistor.

4. A liquid crystal panel as claimed in claim 1, wherein said light-shielding layer is formed to shield from light a source/drain region, a channel forming region, and a gate line of said thin film transistor.

5. A liquid crystal panel as claimed in claim 4, wherein said insulating film has a thickness of at least 100 nm.

6. A liquid crystal panel as claimed in claim 1, wherein an active layer of said thin film transistor comprises polycrystalline silicon.

7. A liquid crystal panel as claimed in claim 1, wherein said light-shielding layer comprises a material selected from the group consisting of polycrystalline silicon, amorphous silicon, SiC, a-SiGe and a-SiGeC.

8. A liquid crystal panel as claimed in claim 1, wherein said thin film transistor is a top gate type transistor or a planer type transistor.

9. A liquid crystal panel comprising
    a driving substrate;
    an insulating film formed on said driving substrate;
    a semiconductor thin film formed above said insulating film as an active layer of a thin film transistor and defining a source region, a drain region, and a channel part under a gate electrode formed on said thin film, said source region and said drain region respectively provided on both sides of the channel part;
    a plurality of said thin film transistors each respectively driving each of an associated plurality of pixel electrodes; and
    a light-shielding layer formed in said insulating film between said thin film of said thin film transistor and said driving substrate, wherein said light-shielding layer comprises a material having a resistance of 10 kΩ per square or more shielding a region extended at least a distance from edge parts of the source region and the drain region in the longitudinal direction of said channel region; and a plurality of electrodes connected to the source and the drain regions on an insulating film covering said thin film transistor, wherein said driving substrate is a transparent substrate, wherein said light-shielding layer shields a region extended at least about 0.5 micrometers from the respective edges of said source and said drain regions of the thin film transistor, and wherein said edge parts to be shielded extend about 1.0 micrometers to an edge of the gate electrode.

* * * * *